United States Patent [19]

Beier

[11] Patent Number: 4,549,124
[45] Date of Patent: Oct. 22, 1985

[54] CIRCUIT ARRANGEMENT FOR CONTROLLING THE ACTION OF AN ADJUSTING DEVICE, IN PARTICULAR FOR A PATIENT CHAIR

[75] Inventor: Stefan Beier, Biberach an der Riss, Fed. Rep. of Germany

[73] Assignee: Kaltenbach & Voigt GmbH & Co., Biberach an der Riss, Fed. Rep. of Germany

[21] Appl. No.: 466,112

[22] Filed: Feb. 14, 1983

[30] Foreign Application Priority Data

Feb. 26, 1982 [DE] Fed. Rep. of Germany ....... 3207068

[51] Int. Cl.⁴ .............................................. G05B 1/06
[52] U.S. Cl. .................................. 318/663; 318/624; 318/678
[58] Field of Search ....................... 318/663, 624, 678; 297/330, 316; 92/5 R; 91/361

[56] References Cited

U.S. PATENT DOCUMENTS 3,726,191  4/1973  Johnston et al. ..................... 92/5 R
3,736,486  5/1973  Gould et al. ..................... 318/678 X
4,128,797  12/1978  Murata ............................... 318/666

Primary Examiner—William M. Shoop, Jr.
Assistant Examiner—Saul M. Bergmann
Attorney, Agent, or Firm—Lewis H. Eslinger

[57] ABSTRACT

A circuit arrangement for controlling the action of an adjusting device, in particular of a patient chair, which comprises, as target value indicator, a digital-analog converter (1) and, as actual value indicator controllable by the adjusting device, a potentiometer (2), which receives an equalized feed voltage which serves to operate the digital-analog converter, and which is connected via a branch (13) to a comparator unit (12), whose other input is connected to output (8) of the digital-analog converter (1), and which controls the adjusting device (31, 32, 33). According to this circuit design, the digital-analog converter (1), and the potentiometer (2), form a Wheatstone bridge of which one diagonal is supplied with a single feed voltage, while the other diagonal contains the comparator unit (12).

6 Claims, 2 Drawing Figures

CIRCUIT ARRANGEMENT FOR CONTROLLING THE ACTION OF AN ADJUSTING DEVICE, IN PARTICULAR FOR A PATIENT CHAIR

DESCRIPTION

The invention concerns a circuit arrangement for controlling the action of an adjusting device, in particular for controlling the height setting, the forward or backward positions—or inclination—of a patient chair, by means of an action mechanism connected to the device in question, which is controlled by a comparator unit, which compares the target value level of any desired target position, indicated by the digital-analog converter of a target value indicator, with the actual value level indicated by any effective adjustment of the adjusting device; which value level is supplied by an actual value level indicator formed by a potentiometer; whereby the comparator unit supplies an output signal to the action mechanism, which will cause a reduction—or the elimination—of the difference between the target value level and the actual value level.

A circuit arrangement of the type described above is already known (DE-PS No. 25 54 059). However, it has been observed that for, and during, the operation of this known circuit arrangement, a balancing process has to take place in the circuit element which processes the analog signals. This balancing process results from the fact that a correct allocation has to be established between the potentiometer arrangement and the analog signals which the digital-analog converter supplies in accordance with digital signals received.

Furthermore, the balancing process in question may also result from various changes in the points of operation of, on the one hand, the digital-analog converter and, on the other hand, the potentiometer, which occur during use and which are due, in particular, to drift caused by the wear and tear of components and temperature effects. In addition, the balancing process in question is necessary because, customarily, the digital-analog converter which forms the target value indicator receives the maintenance voltage it requires for operating from a special power supply unit, whereas the potentiometer which forms the actual value indicator will receive a different feed voltage. Due to the fact that this potentiometer is controlled by the action of the adjusting device—which action must, itself, be controlled—the feed voltage for the potentiometer in question will, customarily, prove to have been derived from the feed voltage for the adjusting device under consideration. On account of the required balancing process, the known circuit arrangement which we have considered, has the disadvantage that it can only work effectively for a relatively short period of time.

There exists also an electric control circuit for adjusting the settings of a medical treatment chair, or similar (DE-OS No. 27 46 630), equipped with at least one actual value indicator connected to a final control element, at least one adjustable target value indicator, a comparator for comparing corresponding actual and target values, as well as with circuit elements for adopting other target values corresponding to new actual values, and various other circuit elements, by means of which a final control element can be controlled by the comparator or by switches. This arrangement uses a digital store as target value indicator and, as comparator, at least one digital comparator, whereby these circuit elements, through the effect of a control panel with program circuits, and via linking arrangements and an amplifier circuit, are coupled to the positioning drive mechanism for at least one final control element. This known control circuit too, presents the disadvantages of the known circuit arrangement considered above.

The objective of the invention is to find a way whereby a circuit arrangement of the type described above, will not require any additional balancing process in the circuit element which processes the analog signals, either at the start or in the course of its operation, and which would, thus, guarantee a reliable control of the action of the adjusting device.

The objective described above can be achieved, according to the invention, by means of a circuit arrangement of the type mentioned at the beginning, in which the equalized feed voltage which serves to operate the digital-analog converter of the target value indicator, is supplied at the same time to the potentiometer which forms the actual value indicator.

The invention has the advantage that, together with relatively few demands on the circuit design, a sure control of the action of the adjusting device is guaranteed, without any balancing process. In addition, the potentiometer will maintain correctly any position chosen, even if a blackout occurs. Another advantage is that both the digital-analog converter of the target value indicator, and the potentiometer forming the actual value indicator are, together with the comparator unit, part of a Wheatstone bridge whose only voltage supply, is the equalized feed voltage which serves to operate the digital-analog converter of the target value indicator. This guarantees, in an advantageous manner, that any voltage changes which might occur, affect the converter and the potentiometer to an equal degree, and that any drift caused by the effects of wear and tear or the temperature, can be kept to a relatively low level, for example around $3 \cdot 10^{-6}/°C$.

The equalized feed voltage is appropriately supplied by an equalizer belonging to the digital-analog converter, which supplies a maintenance voltage to the digital-analog converter. This has the advantage that the technical demands on the circuit design are particularly low as far as the supply of an equalized feed voltage is concerned. Consequently, it will be advantageous to use only commonly available digital-analog converters which contain a similar equalizer, particularly the integrated models. In this case, it will be possible to supply a non-equalized voltage as maintenance voltage to the digital-analog converter in question, and to return the equalized voltage supplied by the built-in equalizer of the digital-analog converter, to the potentiometer mentioned above.

The digital-analog converter will preferably contain an R-2R network. This has the advantage that the circuit design will be extremely simple, and that it will be possible to use a converter element which is commercially available as an integrated circuit. A further advantage of this method is that the drift caused by wear and tear and temperature phenomena, will be extremely small for the entire circuit arrangement.

The comparator unit, which is connected to an output of the digital-analog converter and a branch of the potentiometer, is appropriately formed by an operational amplifier. The resulting advantage is that the technical demands on the circuit design for the generation of an output signal will be particularly low, so that a secure control of the action of the adjusting device will be possible, independent of any temperature or wear and tear phenomena in the indicators of the target, and actual, values.

On the other hand, it is also advantageous to have a comparator unit—connected to an output of the digital-analog converter and a branch of the potentiometer—which is formed by a window discriminator. In addition to the advantage mentioned above, this solution has the advantage that no special evaluation logic will be needed for controlling the action of the adjusting device.

Some examples of the invention are further described by means of drawings.

Figure 1:
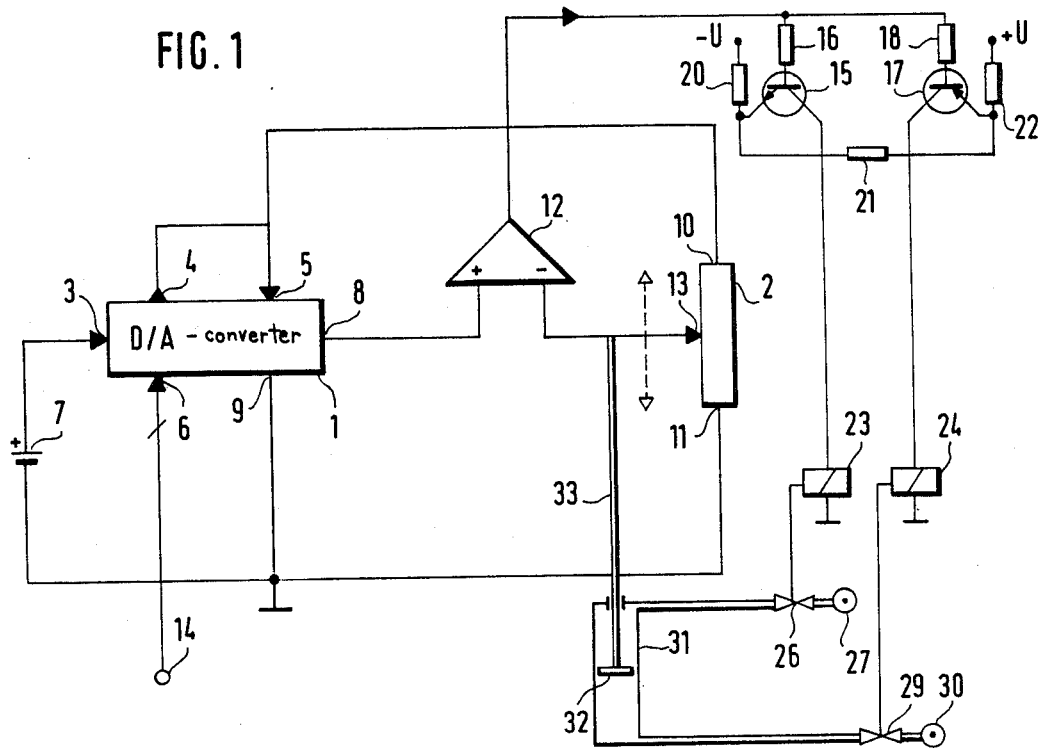
FIG. 1 shows one model of the circuit arrangement according to the invention.

The circuit arrangement shown in FIG. 1 comprises essentially a digital-analog converter 1 belonging to a target value indicator which, in this case, may contain an R-2R network, and a potentiometer 2, for example a carbon potentiometer, belonging to—or constituting—an actual value indicator, which can be adjusted by means of a mechanically connected adjusting device. This adjusting device may be an electrical adjusting device, a pneumatic adjusting device, or another adjusting device.

It serves in particular for controlling the height setting, the forward or backward positions, or inclination, of a patient chair, in particular a chair for dental patients.

The digital-analog converter 1 is connected, with the connections 3 and 9, to a maintenance voltage source 7, which has to supply an equalized maintenance voltage. The maintenance voltage of the maintenance voltage source 7 can be, for example, 7 V. The point of junction of connection 9 of the digital-analog converter 1, and the one pole of the maintenance voltage source 7, is grounded, according to FIG. 1.

Output 4 of the digital-analog converter 1, which supplies an equalized feed voltage, is connected to output 5 of the converter 1, which requires the equalized feed voltage. In addition, output 4 of the digital-analog converter 1, is connected to a terminal 10 of the potentiometer 2. The other terminal 11 of the potentiometer 2 is grounded.

The digital-analog converter 1 is connected via input 6 to a digital signal input 14. This link can consist, for example, of eight single wires, which has been indicated by a diagonal stroke across the line connecting the input connection 14 and input 6. It is possible, therefore, to supply the input connection 14 in question, with a target value equalling a digital value of eight bits at one time, which indicate the desired target position of the adjusting device at any one time.

Output 8 of the digital-analog converter 1, which supplies analog output signals, is connected to the non-inverted output of a comparator unit formed by an operational amplifier 12. The inverted input—of the aforementioned operational amplifier 12 is connection to a branch 13 of the potentiometer 2. As a result, the operational amplifier 12 which forms the comparator unit, is securely located on a diagonal of a Wheatstone bridge formed by the digital-analog converter 1 and the potentiometer 2, whose only operational voltage is the equalized feed voltage supplied by the digital-analog converter 1, at its output 4.

In the circuit arrangement described above and shown in FIG. 1, the operational amplifier 12 will supply, at any given time, one out of two different output signals, dependent upon the fact if the target value output voltage supplied by output 8 of the digital-analog converter 1 is higher or lower than any actual value voltage supplied by branch 13 of the potentiometer 2. If the target value voltage is higher than the actual value voltage, the operational amplifier 12 will supply a positive output voltage. If, on the other hand, the target value voltage is lower than the actual value voltage, the output of the operational amplifier 12 will supply a negative output voltage. The operational amplifier 12, functioning as a comparator unit or a comparator, will switch from one output voltage to the other output voltage, when the target value voltage is equal to the actual value voltage.

The output voltage supplied by the output of the operational amplifier 12, will be evaluated by means of a logic circuit which, according to FIG. 1, contains essentially two transistors 15 and 17. Transistor 15 is of the n-p-n conductivity type, while transistor 17 is of the p-n-p conductivity type. Both transistors 15, 17 are connected with their bases to the output of the operational amplifier 12, via current limiting resistors 16 and 18. At the point of junction, the emitter of the transistor 15 is connected to two resistors 20, 21 which, together with a resistor 22, form a voltage divider located between −U and +U of a voltage source. These single voltage sources which, together, form the voltage source, may be grounded at their common point of junction. The emitter of the transistor 10 is connected to the common point of junction of the resistors 21 and 22 of the voltage divider.

The collector circuit of transistor 15 contains a magnetic relay 23, while the collector circuit of transistor 17 contains a magnetic relay 24. A valve 26 belongs to the magnetic relay 23, while a valve 29 belongs to the magnetic relay 24. These valves 26, 29 are connected to fluid sources 27 or 30 which may consist of, for example, compressed air sources, and which are linked, by means of the aforementioned valves 26, 29 and corresponding inlets, to a cylinder arrangement 31. The cylinder arrangement 31 contains a piston 32 which is connected, via a piston rod 33, to both the adjusting device for the action control, and to branch 13 of the potentiometer 2.

The circuit arrangement shown in FIG. 1 functions in such a way that, for a given actual value adjustment of the adjusting device which needs to be activated, and therefore of the potentiometer 2, a target value level at output 14, corresponding to a changed target value, will cause the earlier described Wheatstone bridge, containing the digital-analog converter 1 and the potentiometer 2, to abandon its balanced state, as a result of which the operational amplifier 12 will supply such an output voltage that the action mechanism, and, therefore, branch 13 of the potentiometer 2, are activated in a direction which will lead to a reduction, or the elimination, of the difference between the target value level and the actual value level.

Figure 2:
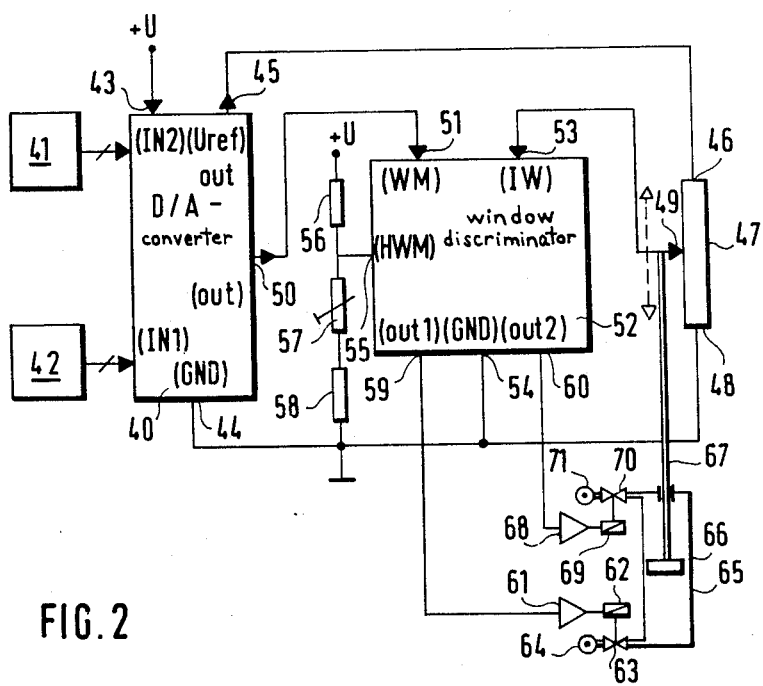
FIG. 2 shows a second model of the circuit arrangement according to the invention.

The circuit arrangement shown in FIG. 2 corresponds, in its basic layout, to the circuit arrangement shown in FIG. 1. FIG. 2 involves a digital-analog converter 40, containing an R-2R network, whose input may be connected, by means of four single wires each, to two adjusting mechanisms 41 and 42. Together, these two adjusting mechanisms 41, 42 supply a digital target value signal of eight bits, to the inputs which are indicated in FIG. 2 by (IN1) and (IN2).

At a voltage supply input 43, the digital-analog converter 40 receives a maintenance voltage from a connection +U which, for example, is fed with a non-equalized feed voltage. From this feed voltage, the digital-analog converter 40 will derive the equalized feed voltage needed for its operation, which feed voltage is also delivered to an output 45, indicated by (Uref$_{out}$) in FIG. 2. Output 45 of the digital-analog converter 40 is connected to one end 46 of a potentiometer 47; the other end 48 of the potentiometer 47, is grounded jointly with a connection 44—indicated by (GND)—of the digital-analog converter 40.

Output 50—indicated by (OUT)—of the digital-analog converter 40, is connected to input 51—also indicated by (wm) and to be described hereafter—of a window discriminator 52. The window discriminator 52 is connected, by means of input 53 indicated by (iw), to a branch 49 of the potentiometer 47. On account of the fact that, according to FIG. 2, the window discriminator 52 functions as a comparator unit, this circuit arrangement will have the same configuration as the circuit arrangement in FIG. 1. This means that the digital-analog converter 40 and the potentiometer 47 form a Wheatstone bridge which contains, in one of its diagonals, the window discriminator 52, and whose other diagonal will receive the equalized feed voltage which the digital-analog converter 40 makes available between its connections 44 and 45.

The window discriminator 52 is grounded through its connection 54, indicated by (GND). By means of its output 59, indicated by (out1), the window discriminator 52 is connected, via an amplifier 61, to a magnetic relay 62, which allows control of a valve 63. A fluid source 64—formed in particular by a compressed air source—is connected, by means of a valve 63, to the end of a cylinder arrangement 65, containing a piston 66 which is connected, by means of a piston rod 67, to the branch 49 of the potentiometer 47 and, moreover, to the adjusting device, which FIG. 2 does not specify either.

Output 60—indicated by (out2)—of the window discriminator 52, is connected to an amplifier 68, which controls a magnetic relay 69 which, in turn, allows control of a valve 70. A fluid source 71—formed in particular by a compressed air source—is connected, by means of the valve 70, to the other end of the cylinder arrangement 65.

The window discriminator 52 is connected, by means of a connection 55 indicated by (hwm) in FIG. 2, to a voltage divider consisting of three resistors 56, 57 and 58, located between a voltage point with a +U voltage, and a ground, and whose size and layout define a so-called half-window area, i.e. a voltage reach within which the window discriminator 52 will not supply any output signals, neither at its output 59, nor at its output 60. This means that a specific output signal—e.g. one corresponding to a "1" signal—will be supplied by the window discriminator 52 via one of its outputs 59, 60, when the actual value (iw) fed to input 53 of the window discriminator 52, is lower than the value resulting from the difference between the target value supplied by the digital-analog converter 40 and defined by the window center (wm), and the half-window area. The other output of both outputs 59, 60 of the window discriminator 52 will, on the other hand, supply a corresponding output signal when the actual value (iw) fed to input 53 of the window discriminator 52, is larger than the sum of the target value at input 51, which defines the window center (wm), and the half-window area, which is defined by the signal at input 55 of the window discriminator 52.

Although the circuit arrangements described above by means of FIGS. 1 and 2 will, at any given time, supply their output signals immediately, the reaction to any adjustments of the adjusting devices connected to the circuit arrangements, will occur with a certain delay. Allowances have to be made for these delayed adjustments.

With regard to the models of the circuit arrangements according to the invention and shown in the drawings, it should be noted that the displacement of any adjusting device provided, must be made to correspond to the guidance reach of any potentiometer provided. In addition, it should be noted that the target value voltage of any digital-analog converter provided, and the actual value voltage derived from any potentiometer provided, must not exceed the equalized feed voltage needed for the operation of the digital-analog converter, and supplied by the latter. This will guarantee that the entire action reach of the adjusting device will fall within the active displacement reach of the potentiometer. We should, furthermore, point out that it is possible to use, instead of the digital-analog converter described, a digital-analog converter operating according to different principles.

In conclusion, it should be noted that it is possible, for the realization of the circuit arrangements described above, to use commercially available components. For example, for the digital-analog converter 1 indicated in FIG. 1, and for the digital-analog converter 40, indicated in FIG. 2, one can always use a digital-analog converter of the company Ferranti Semiconductors with, respectively, the reference numbers ZN428E-8 or ZN428J-8. As operational amplifier 12, according to FIG. 1, one may use any commonly used operational amplifier. As adjusting mechanisms 41, 42, shown in the circuit arrangement according to FIG. 2, one may use adjusting mechanisms with reference number 230034G, of the company TEKELEC Airtronic. As window discriminator one may use a commercially available component, with the commercial reference TCA965.

We claim:

1. A circuit arrangement for controlling the action of an adjusting device comprising:
   an action mechanism connected to said adjusting device and operable in response to a control input;
   a comparator for comparing a target value of a desired position with an actual value of an actual position and producing an output signal representing the difference therebetween fed as said control input to said action mechanism, whereby said action mechanism is operated to cause a reduction in said difference between said target value and said actual value;
   a target value indicator including a digital-analog converter for supplying said target value;
   an actual value indicator including a potentiometer controlled by operation of said adjusting device for supplying said actual value; and
   an equalized feed voltage circuit connected to operate said digital-analog converter of said target value indicator and connected to supply said potentiometer of said actual value indicator, whereby mutual drift between said digital-analog converter and said actual value indicator is eliminated.

2. The circuit arrangement of claim 1, wherein said equalized feed voltage circuit is connected to said digital-analog converter through an equalizer, thereby providing a maintenance voltage for said digital-analog converter.

3. The circuit arrangement of claim 1, wherein said digital-analog converter contains an R-2R voltage divider network.

4. The circuit arrangement of claim 1, wherein said comparator is an operational amplifier and is connected to an output of said digital-analog converter and to a branch of said potentiometer.

5. The circuit arrangement of claim 1, wherein said comparator is a window discriminator and is connected to an output of said digital-analog converter and to a branch of said potentiometer.

6. The circuit arrangement of claim 2, wherein said equalizer feed voltage circuit comprises a Wheatstone bridge connected such that a reference voltage connection of said digital-analog converter and a connection of said potentiometer have the same reference potential; the connection of said digital-analog converter which supplies said equalized feed voltage is coupled with a second connection of said potentiometer and said comparator is connected in a diagonal of said Wheatstone bridge between the potentiometer branch and the connection of said digital-analog converter indicating said target value level.

* * * * *